United States Patent

Boarman et al.

(10) Patent No.: US 7,543,453 B2
(45) Date of Patent: Jun. 9, 2009

(54) MEASURED FILL WATER DISPENSER FOR REFRIGERATOR

(75) Inventors: Patrick J. Boarman, Evansville, IN (US); Justin A. Woehler, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 292 days.

(21) Appl. No.: 11/298,789

(22) Filed: Dec. 9, 2005

(65) Prior Publication Data

US 2007/0130965 A1 Jun. 14, 2007

(51) Int. Cl.
*B67D 5/62* (2006.01)
(52) U.S. Cl. .................... 62/98; 62/389; 222/146.6
(58) Field of Classification Search ........... 62/389–400; 222/146.6
See application file for complete search history.

(56) References Cited

U.S. PATENT DOCUMENTS

| | | | |
|---|---|---|---|
| 3,937,362 A | 2/1976 | Salmijak et al. ............... 222/20 |
| 4,023,708 A | 5/1977 | Fornasari ..................... 222/20 |
| 4,413,752 A * | 11/1983 | McMillin et al. .............. 222/56 |
| 4,428,088 A | 1/1984 | Getz et al. ..................... 8/158 |
| 4,572,253 A | 2/1986 | Farmer et al. ................. 141/95 |
| 5,124,934 A | 6/1992 | Kawamoto et al. .......... 364/510 |
| 5,249,706 A | 10/1993 | Szabo ......................... 222/20 |
| 5,429,272 A | 7/1995 | Luigi ........................... 222/14 |
| 5,439,019 A * | 8/1995 | Quandt et al. .................. 137/2 |
| 5,491,333 A | 2/1996 | Skell et al. ............... 250/222.1 |
| 5,550,369 A | 8/1996 | Skell et al. ............... 250/222.1 |
| 5,829,263 A | 11/1998 | Park ............................ 62/177 |
| 5,836,168 A * | 11/1998 | Lee .............................. 62/129 |
| 5,858,215 A * | 1/1999 | Burchard et al. .............. 210/87 |
| 6,041,607 A | 3/2000 | Kim ............................. 62/188 |
| 6,912,870 B2 | 7/2005 | Gnadinger .................... 62/389 |
| 7,010,974 B2 * | 3/2006 | Spanke et al. ............. 73/290 V |
| 7,201,005 B2 * | 4/2007 | Voglewede et al. ............ 62/126 |
| 2004/0261433 A1 | 12/2004 | Gnadinger ................... 62/137 |
| 2004/0261434 A1 | 12/2004 | Zentner et al. ................ 62/137 |
| 2007/0214880 A1* | 9/2007 | Spanke et al. ............. 73/290 V |

* cited by examiner

*Primary Examiner*—William E Tapolcai
(74) *Attorney, Agent, or Firm*—Kirk Goodwin; Michael D. Lafrenz

(57) ABSTRACT

A refrigerator with a water dispenser for dispensing water from a source of water through a user accessible water outlet. The water dispenser can include a water valve, a dispensing actuator, and a water dispensing control connected to the water valve and to the dispensing actuator to control operation of the water valve. The water dispenser can include a microcontroller including a user operable calibration routine to determine a calibrated flow rate based on the time to dispense a standard quantity of water, and a non-volatile storage to store the calibrated flow rate. The microcontroller can store the most recent calibrated flow rate in the non-volatile storage. The water dispenser control can include a measured fill mode of operation. The microcontroller can be arranged to calculate a measured fill time to dispense a user selected amount of water based on the calibrated flow rate.

20 Claims, 6 Drawing Sheets

MEASURED FILL WATER DISPENSER FOR REFRIGERATOR

CROSS REFERENCE TO RELATED APPLICATIONS

This application is related to pending U.S. patent application Ser. No. 10/861,203 filed Jun. 4, 2004.

BACKGROUND OF THE INVENTION

1. Field of the Invention

The invention relates to ice and water dispensers for refrigerator freezers. More particularly the invention relates to a water dispenser that can dispense measured amounts of water or can dispense water in a normal fill mode in which water is dispensed as long as an actuator is operated by the user.

2. Description of the Related Art

Refrigerator freezers having ice and water dispensers are known. Liquid dispensers that dispense measured amounts of liquid are also known. Liquid dispensers arranged to automatically fill a container with liquid are also known.

SUMMARY OF THE INVENTION

In one aspect the invention relates to a refrigerator having a water dispenser for dispensing water from a source of water through a user accessible water outlet. The water dispenser can include a water valve connected to the source of water and to the water outlet to control flow of water to the water outlet, a dispensing actuator, and a water dispensing control connected to the water valve and to the dispensing actuator to control operation of the water valve. The water dispenser can include a microcontroller including a user operable calibration routine to determine a calibrated flow rate based on the time to dispense a standard quantity of water, and a non-volatile storage to store the calibrated flow rate. The microcontroller can store the most recent calibrated flow rate in the non-volatile storage. The water dispenser control can include a measured fill mode of operation. The microcontroller can be arranged to calculate a measured fill time to dispense a user selected amount of water based on the calibrated flow rate.

The microcontroller can include a timer and the measured fill time can be loaded into the timer. The microcontroller can be arranged to operate the water valve for the measured fill time to dispense the user selected amount of water upon operation of the dispensing actuator. The water dispenser control can include a normal fill mode of operation in which the microcontroller operates the water valve in response to operation of the dispensing actuator.

The refrigerator can include an ice maker and an ice maker water valve connected to the source of water and to the ice maker to control flow of water to the ice maker. The microcontroller can operate the ice maker water valve to add an amount of water to the ice maker based on the calibrated flow rate and any differences in the calibrated flow rate and the ice maker water valve flow rate.

The microcontroller is arranged to calculate the amount of water dispensed based on the time the water valve is operated and the calibrated flow rate. The water dispenser can include a user interface having a display for the amount of water dispensed. The microcontroller can be arranged to operate the display to inform the user of the amount of water dispensed.

The water dispenser can include a user interface including a selection actuator arranged for a user to select the units and amount of water to be dispensed.

The refrigerator can include a water filter connected between the source of water and the water outlet. The microcontroller can be arranged to store the accumulated amount of water flowing through the water filter in the non-volatile storage. The microcontroller can be arranged to calculate the amount of water flowing through the water filter based on the time the water valve is operated and the calibrated flow rate. The microcontroller can add the amount of water passing through the water filter when the water valve is operated to the accumulated amount of water passing through the water filter stored in the non-volatile storage. The water dispenser can include a user interface having a water filter condition display and a filter reset actuator. The microcontroller can be arranged to operate the water filter condition display based on the accumulated amount of water passing through the water filter stored in the non-volatile storage and the elapsed time since the filter reset actuator was last operated.

The user operable calibration routine can include filling a container with the standard quantity of water by manually operating the dispensing actuator. Alternately, the water dispensing control can include a sensor arranged to sense the standard quantity of water in a container positioned adjacent the user accessible water outlet. The user operable calibration routine can include filling a container with the standard quantity of water by sensing the standard quantity of water with the sensor. The sensor can be an ultra-sonic sensor arranged to detect the standard quantity of water in the container. Alternately the sensor can be an optical sensor arranged to detect the standard quantity of water in the container. Alternately, the sensor can arranged to detect a standard quantity of water in the ice mold of an ice maker.

In another aspect the invention relates to a method of calibrating the amount of water flowing through an appliance water valve controlled by a water valve control including a microcontroller having non-volatile storage. The method can comprise determining the time for the water valve to dispense a standard quantity of water, calculating a calculated flow rate for dispensing the standard quantity of water based on the time to dispense the standard quantity of water, and storing the calculated flow rate in the non-volatile storage. The method can further include calculating a measured fill time for a user selected amount of water to be dispensed based on the calculated flow rate.

The method can further include calculating the amount of water flowing through the water filter in the appliance based on water valve operating time and the calculated flow rate, accumulating the amount of water flowing through the water filter in the non-volatile storage, and operating a water filter condition display based on the accumulated amount of water flowing through the water valve stored in the non-volatile storage and the elapsed time since a filter reset actuator was last operated.

DESCRIPTION OF THE INVENTION

The use of refrigerator water dispensers has changed with the advent of the addition of water filters to refrigerators. Consumers desiring filtered water are increasingly using filtered water from a refrigerator water dispenser instead of using sink mounted or countertop water filtration systems. Accordingly, consumers desire more flexibility and features from their refrigerator water dispenser. One aspect of an improved water dispenser for a refrigerator is the provision of measured fill capability to allow the user to select or choose predetermined amounts of water to be dispensed. While the water dispenser according to the invention is disclosed as part of an ice and water dispenser for a refrigerator freezer, those skilled in the art should understand that the water dispenser according to the invention can be used as a water dispenser only and not combined with an ice dispenser. Accordingly, the water dispenser according to the invention will be referred to as a water dispenser with the understanding that water dispenser is to be understood as referring to both a water dispenser and a combined ice and water dispenser.

Figure 1:
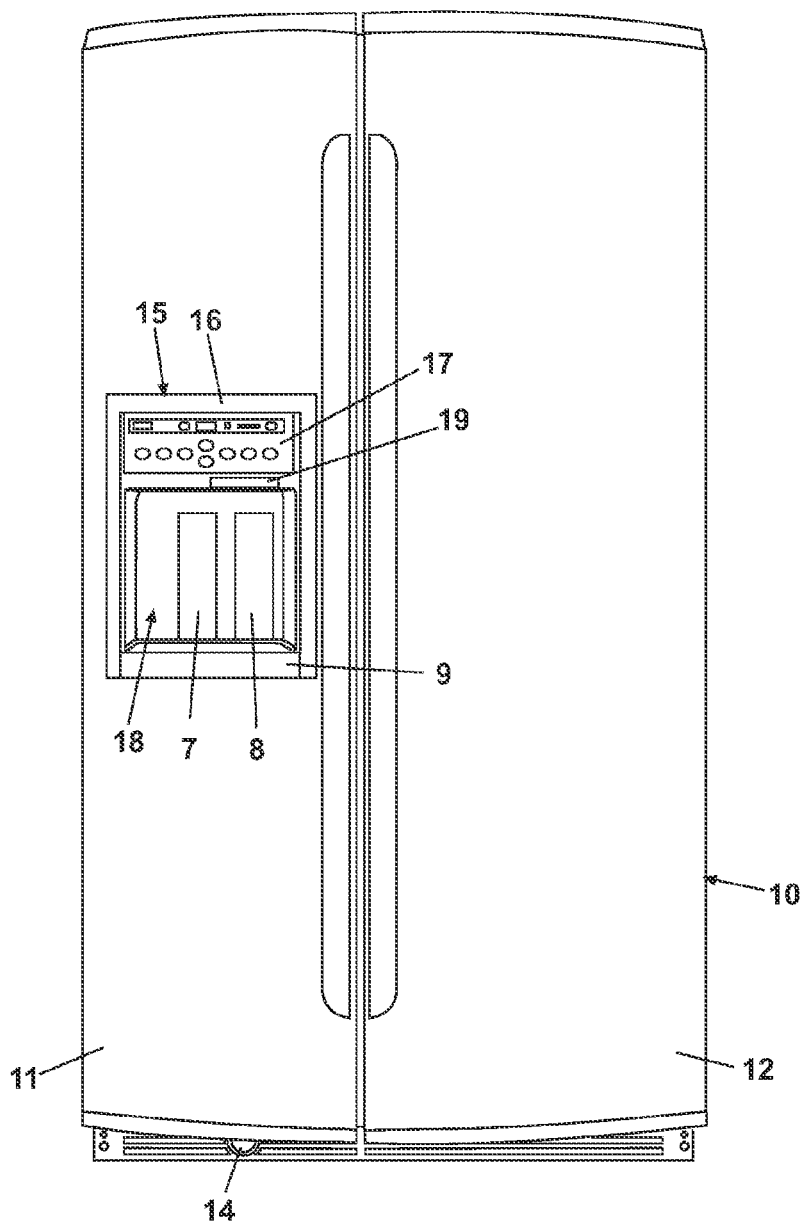
FIG. 1 is a front view of a refrigerator freezer having a measured fill water dispenser according to the invention.

Turning to FIG. 1, a refrigerator freezer 10 can include a water dispenser 15 mounted on the door 11 of the freezer compartment. The refrigerator compartment can have a door 12. While the refrigerator freezer shown in FIG. 1 is a side by side refrigerator freezer, a water dispenser according to the invention could be used in conjunction with a refrigerator freezer having a top or bottom freezer configuration, a refrigerator or a freezer having a single door. Water dispenser 15 can include a dispenser housing 16 mounted on the face of the freezer door 11. Those skilled in the art will understand that water dispenser 15 can be mounted on the face of refrigerator door as well as a freezer door. Dispenser housing 16 can include a user interface 17 and a recess 18 forming a cavity to receive a container to be filled. Dispenser housing 16 can also include a spout 19 for delivering water to a container. Spout 19 can be movable to facilitate filling of different size containers. Co-pending patent application Ser. No. 10/860,906, filed Jun. 4, 2004, discloses movable spout arrangements that can be used with a water dispenser according to this invention which patent application is incorporated by reference. Dispenser housing 16 can include actuators 7 and 8 that can be paddles or pads in recess 18 for actuating the ice dispenser and water dispenser as is well known in the art. While actuators 7 and 8 are described as paddles or pads, those skilled in the art will understand that actuators 7 and 8 can be any mechanism arranged to be engaged by a container to be filed. Actuators 7 and 8 will be referred to as paddles in this application, but paddles should be understood as any mechanism arranged to be engaged by a container to be filled with ice pieces or water. Dispenser housing 16 can also include a shelf 9 in the bottom of the recess for supporting a container being filled.

Figure 2:
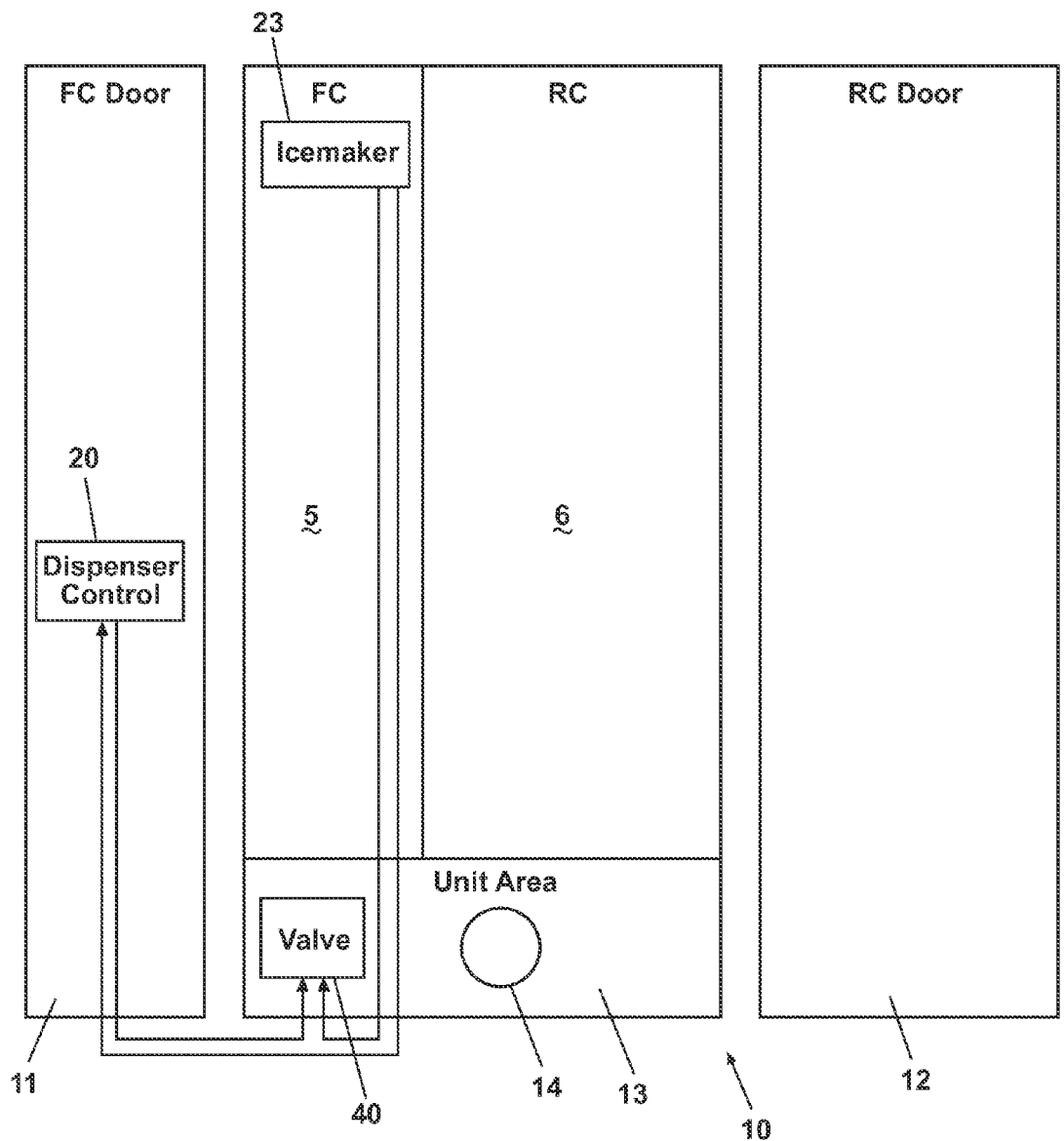
FIG. 2 is a schematic drawing of a refrigerator freezer having a measured fill water dispenser according to the invention illustrating the location of major components.

Turning to FIG. 2, the location of certain water dispenser control components for one embodiment of the invention can be seen in schematic form. A water dispenser according to the invention can include a dispenser control 20 that can include a microcontroller 26. In the embodiment shown schematically in FIG. 2, dispenser control 20 can be located in the freezer compartment door 11. A water valve 40 can be located in unit area 13 under the freezer compartment 5 and refrigerator compartment 6. While the operation of dispenser control 20 will be described in connection with water dispensing operations, the control can also provide control of ice making and ice dispensing operations as well. Those skilled in the art will understand that well known cables, bus and circuit board interfaces can be provided to connect and operate components involved in water dispensing operations. Those skilled in the art will also understand that dispenser control 20 can be positioned elsewhere in a refrigerator, freezer or refrigerator freezer as desired.

Figure 1A:
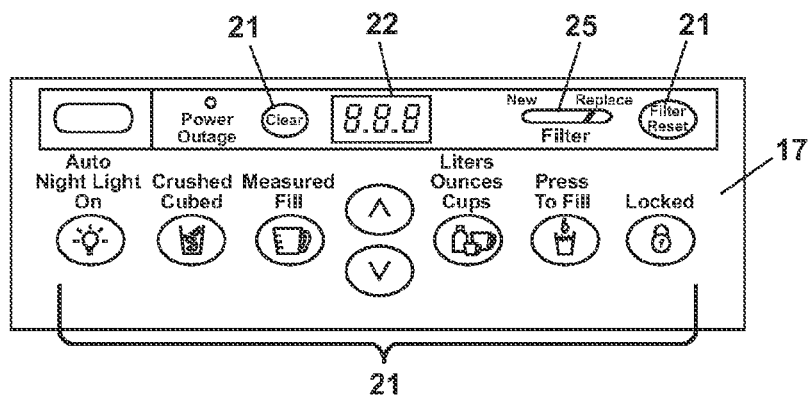
FIG. 1A is an enlarged front view of a user interface for one embodiment of a measured fill water dispenser according to the invention.

Turning to FIG. 1A, a user interface 17 for the water dispenser embodiment of FIG. 1 can be seen in greater detail. In this embodiment, user interface 17 can include a plurality of touch pads 21 and LEDs, not shown, to illuminate or indicate actuation of the touch pads 21. In the embodiment shown in FIG. 1A the operator touch pads 21 can be labeled: Calibrate, Press to Fill, Liters/Ounces/Cups, Increase, Decrease, Measured Fill, Crushed/Cubed, Auto/Nightlight/On, Filter Reset and Clear. Additional operator touch pads 21 can be provided to control ice dispenser and, if desired, other refrigerator operations as will understood by those skilled in the art. While touch pads 21 are shown in this embodiment of the invention, those skilled in the art will understand that buttons or other user operable switches can be used on user interface 17. User interface 17 can also include a display 22 that can be a LCD display that can display a plurality of 7-segment digits or other predetermined icons that are well known in the art.

Figure 3:
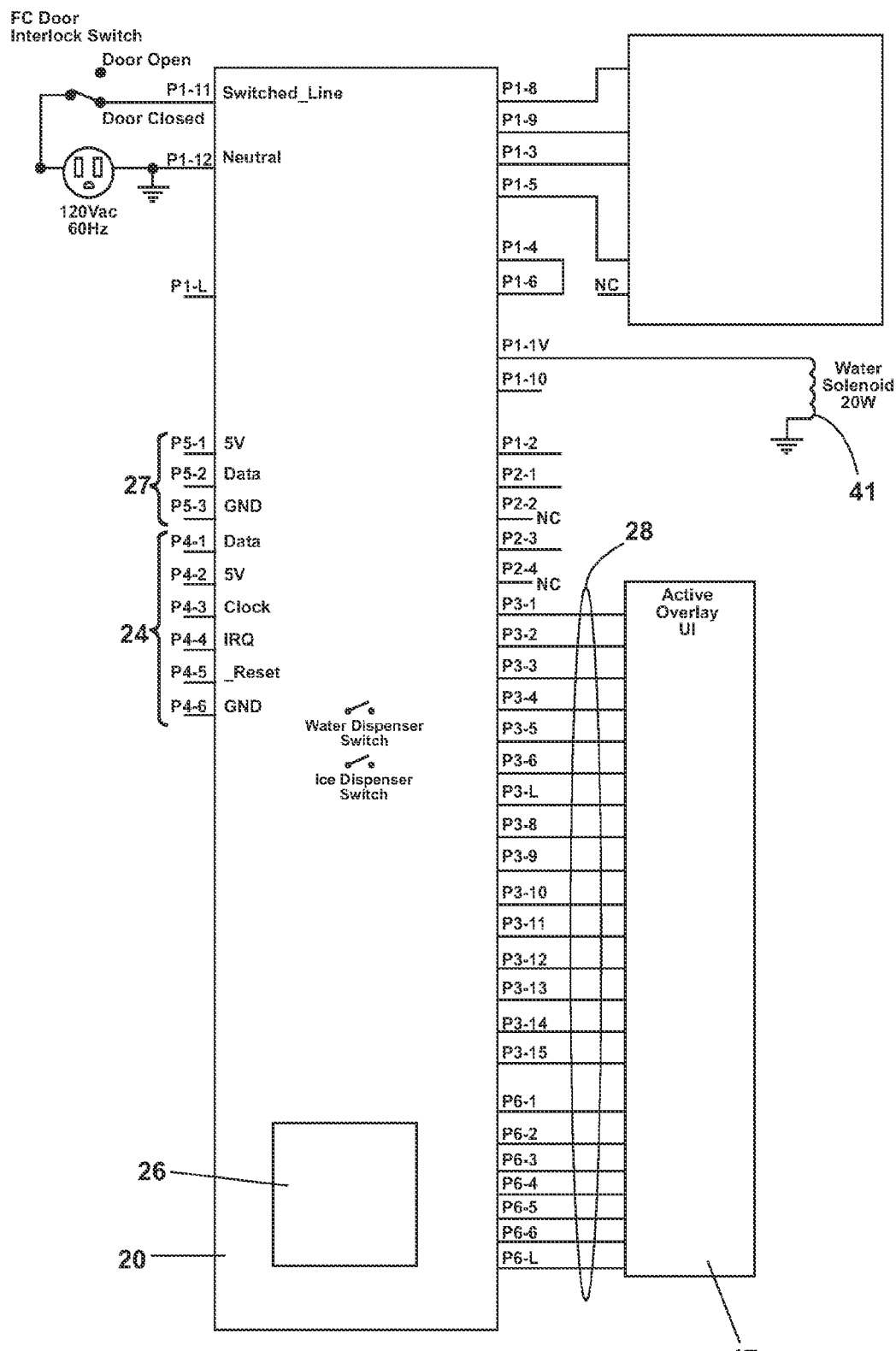
FIG. 3 is a schematic drawing of one embodiment of a dispenser control that can be used with a measured fill water dispenser according to the invention.

Turning to schematic drawings FIG. 2 and FIG. 3 the operation and interaction of the dispenser control 20 will be described in greater detail. Dispenser control 20 can be a smart control and can include a microcontroller 26 mounted on a circuit board as is well known in the art. Dispenser control 20 can provide for user interaction with the ice and water dispensers. Dispenser control 20 can be positioned adjacent user interface 17 which can be a traditional active overlay or a touch sensor active overlay device as are well known in the art. User interface 17 can include switches, such as touch pads 21, LEDs and one or more LCD displays such as display 22 and can include one or more phototransistors, and/or IR sensors if it is desired to measure ambient light conditions or detect motion in the vicinity of the water dispenser 15. User display 22 can include one or more 7-segment LCD displays as are well known in the art. User interface 17 can include an active overlay, and can be connected to user interface control 20 by a pin connector or cable 28 as is well known in the art. Dispenser control 20 can read the user interface/active overlay buttons, switches, touch pads, phototransistor, if used, and any other sensors. Those skilled in the art will understand that other typical ice and water dispenser components such as an ice dispenser motor, an ice crusher, the ice maker or other user controlled refrigerator freezer components can be controlled by the dispenser control 20 if desired.

Microcontroller 26 can be programmed with decision software that can operate on an "if" "then" basis in which an action to be taken can be based on the input can be found in look up tables stored in non-volatile storage or memory as is well known in the art. The software can be programmed to include possible modes of operation, possible inputs and possible, and if desired, maximum outputs. The programming of the microcontroller 26 can be general to cover all known and anticipated embodiments of ice and water dispensers. Microcontroller 26 can be arranged for flash programming of flash (non-volatile) memory. Calibration values and features can be programmed into dispenser control 20 by flash programming to set a dispenser control 20 for the particular brand/model of refrigerator freezer in which it will be used. Dispenser control 20 can include a flash programming port 24 and a communication port 27 to facilitate programming of microcontroller 26 during manufacturing, or in the field, as will be readily understood by those skilled in the art.

As noted above dispenser housing 16 can include an ice dispensing paddle 7 in recess 18. Dispenser control 20 can be arranged to control dispensing of ice pieces upon actuation of paddle 7 by energizing an ice dispenser motor, not shown. Dispenser control 20 can also be arranged to allow a user to operate the ice dispenser by touching a touch pad 21 on the user interface 17.

A water dispenser according to the invention can include a normal fill mode of operation in which water is dispensed as long as an actuator such as paddle 8 is operated by a user in the normal fill mode of operation. In a measured fill mode of operation a water dispenser can dispense an amount of water selected by the user. The measured fill mode according to the invention is a time-based approach. When measured fill is selected dispenser control 20 calculates the amount of time water valve 40 must be operated to dispense the selected amount of water. Dispenser control 20 can be arranged to allow the user to calibrate the dispenser control to account for variations in water pressure that may be encountered depending on the installation location and upon variations in water pressure in a particular installation location over time. Applicant(s) have found that a simple calibration process can facilitate use of a time-based approach to provide a measured fill option for a water dispenser.

Figure 5:
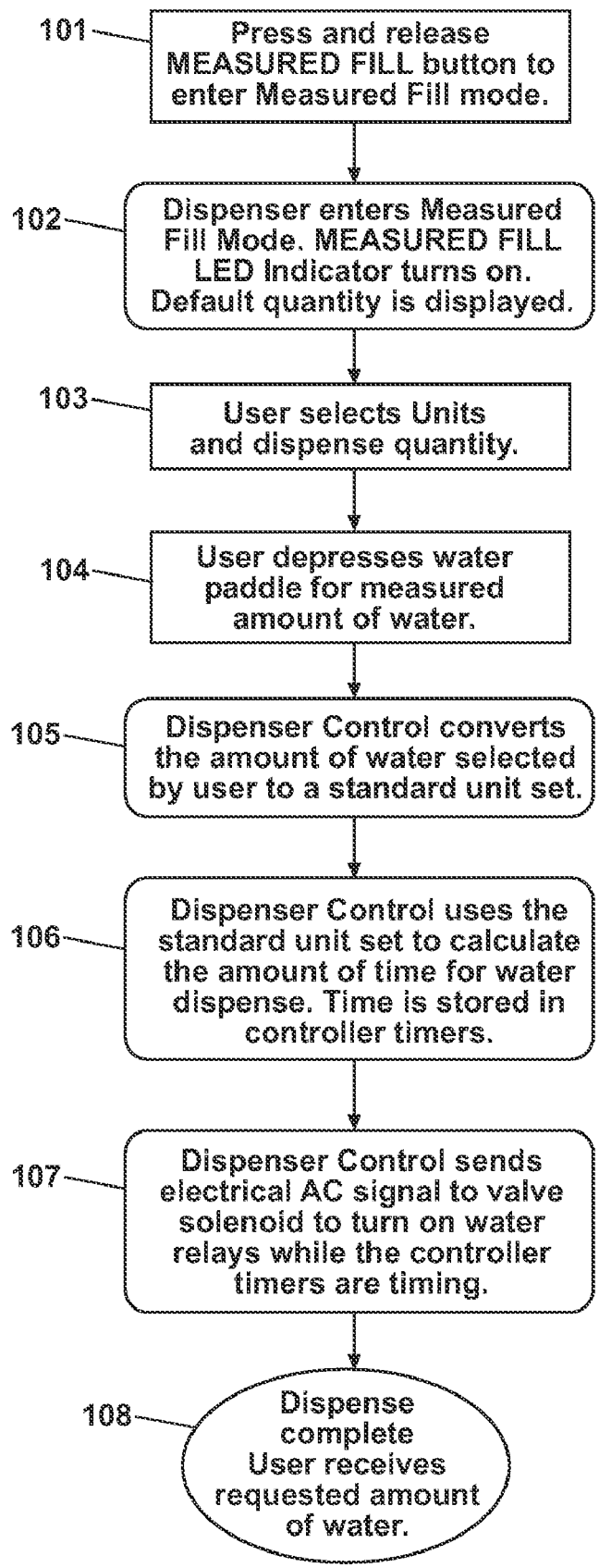
FIG. 5 is a flow chart illustrating operation of one embodiment of a measured fill water dispenser according to the invention.

Turning to FIG. 1A and FIG. 5, a user can select a measured fill mode of operation by touching the touch pad 21 labeled Measured Fill for a predetermined period of time, for instance for three seconds. Touching and holding Measured Fill touch pad 21, block 101, for a predetermined period can cause the dispenser control 20 to enter the Measured Fill mode and illuminate the Measured Fill touch pad 21, block 102, indicating that the measured fill mode has been selected. The dispenser control 20 can be arranged to allow the user a predetermined period of time in which to make a further selection, and if not, exit the measured fill mode and return to the normal fill mode. For example, if the user takes no further action for ten seconds the dispenser control 20 can exit the measured fill mode to the normal fill mode. Upon selection of the measured fill mode of operation the user can select the units of measure and the quantity of water to be dispensed, block 103. The user can select the units of measure by touching the Liters/Ounces/Cups touch pad 21. For each time a user touches or presses the Liters/Ounces/Cups touch pad 21 the dispenser control 20 can change the unit of measure to the next unit of measure in a sequence which can be: liters, ounces and cups. Those skilled in the art will understand that any units of measure can be added or substituted for liters, ounces and cups as desired. The user can also select the quantity of water to be dispensed by touching the Increase or Decrease touch pads 21. Depending upon the units selected the amount of water dispensed can be changed in discrete amounts for each touch of the Increase or Decrease touch pads 21. For example, increase or decrease amounts could be 1 ounce, ¼ or ⅓ cup, or 0.05 liters. Those skilled in the art will understand that the increment/decrement amounts can be set to different amounts as desired. After making measured fill selections, or determining that prior or preset selections are satisfactory, the user can initiate a measured fill by pressing and holding water paddle 8, or touching and releasing the Press to Fill touch pad 21, block 104. The water dispenser can be arranged to countdown and display the measured fill from the amount selected to "0" when the measured fill dispensing cycle is complete on display 22. Those skilled in the art will understand that the dispenser control 20 can be arranged to count up as the container is filled in the measured fill mode instead of counting down to zero as the selected amount of water is dispensed. A measured fill dispensing cycle can be paused by releasing water paddle 8, or touching and releasing the Press to Fill touch pad 21 if Press to Fill touch pad 21 is used to start the dispensing cycle. A measured fill dispensing cycle can be paused for a predetermined period, such as one minute, after which the measured fill mode can be exited and dispenser control 20 can return to the normal fill mode of operation. A dispensing cycle can be resumed by again pressing water paddle 8 or touching and releasing the Press to Fill touch pad 21 so long as the dispenser control remains in the measured fill mode of operation. After completion of a dispensing cycle the dispensing control 20 can be arranged to remain in the measured fill mode for a predetermined period such as one minute and then revert to the normal fill mode of operation. The dispenser control 20 can also be arranged to allow a user to abort a dispensing cycle by touching and releasing the Measured Fill touch pad 21. The dispenser control 20 can be arranged to prohibit water dispensing when the freezer compartment door 11 is opened. In a normal fill mode of operation dispenser control 20 can activate water valve 40 when paddle 8 or Press to Fill touch pad 21 are operated by a user as will be described in more detail below.

An example of a measured fill operation can be seen by referring to FIG. 5, blocks 104-108. When the user presses paddle 8 or touches the Water Fill touch pad 21 microprocessor 26 can determine how long to activate water valve 40. In order to determine how long water valve 40 should be energized microcontroller 26 can convert the amount of water selected by the user into a quantity of standard units, block 105. In one embodiment of the invention a standard unit can be 0.512 mL. For example, if the user selects ounces as the unit of measure the following algorithms can be used to convert the quantity of water to be dispensed to standard units and convert standard units to measured fill time:

$$\text{Measured Fill Amount (in units)} = \frac{\text{selected amount (in oz)} * \text{conversion mL/oz}}{0.512 \text{ mL/unit}} \quad (1)$$

$$\text{Measured Fill Time (sec)} = \frac{\text{Measured Fill Amount (units)}}{\text{Calibrated } WDV \text{ Flow Rate (units/sec)}} \quad (2)$$

Determination of the calibration value Calibrated WDV Flow Rate (units/sec) will be explained below. Calibrated WDV Flow Rate will sometimes be referred to as the calibrated flow rate in this application. A Measured Fill Time calculated by microcontroller 26 can be stored in a timer (not shown) in microcontroller 26, block 106. Dispenser control 20 can then send a signal to water valve control solenoid 41 energizing the water valve 40 (FIG. 3) for the Measured Fill Time stored in the microcontroller 26 timer, block 107. At the expiration of the Measured Fill Time dispenser control 20 can de-energize the water valve solenoid 41 and dispensing of the selected amount is complete, block 108. As described in related co-pending U.S. patent application Ser. No. 10/861,203, filed Jun. 4, 2004 and incorporated fully herein by reference, an audible signal device can be used to provide signals to indicate completion of a measured fill dispensing cycle as well as other events that can include confirmation that a command has been accepted, an error signal to advise the user of error conditions and the like.

Figure 4:
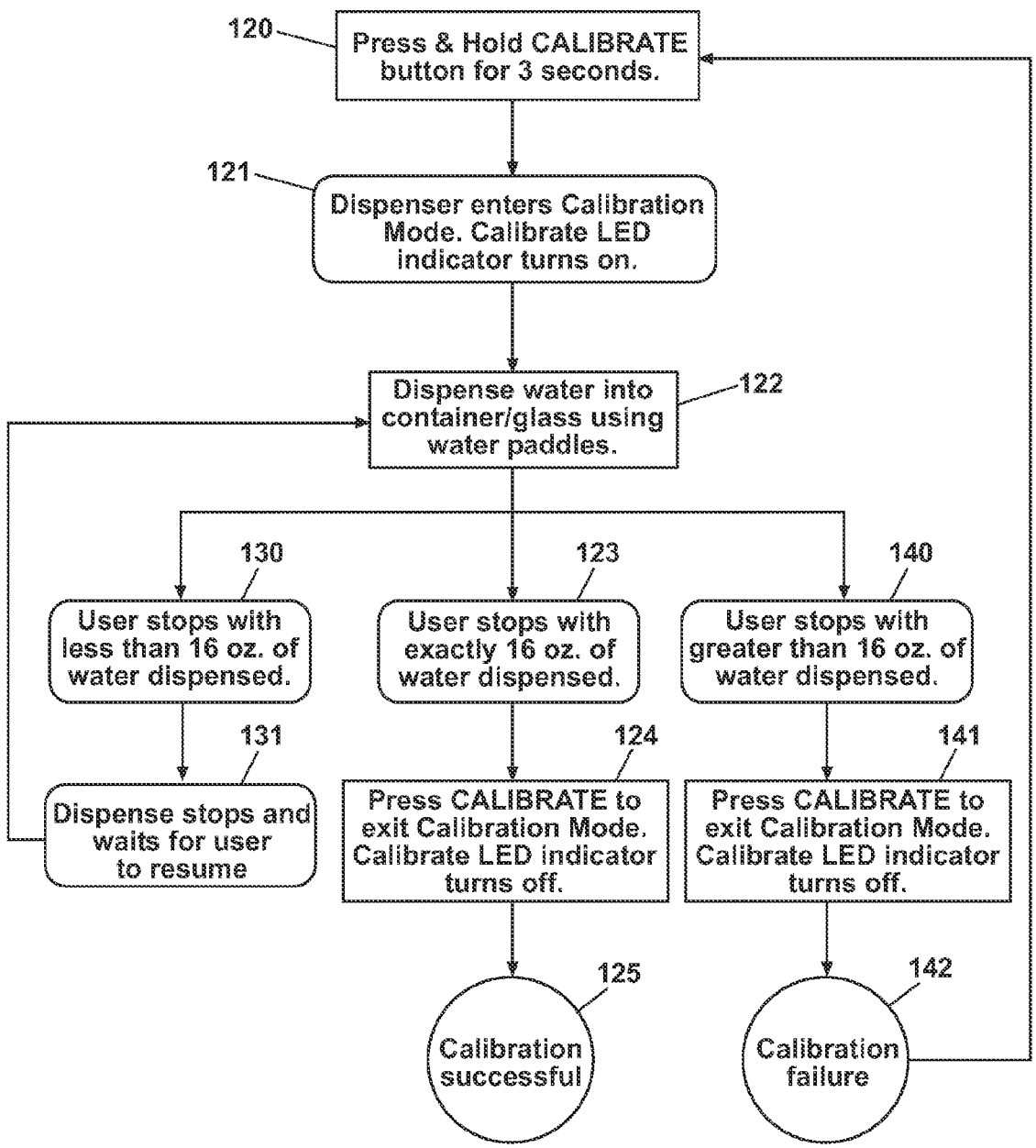
FIG. 4 is a flow chart illustrating one embodiment of the method of calibrating a measured fill water dispenser control according to the invention.
Figure 6:
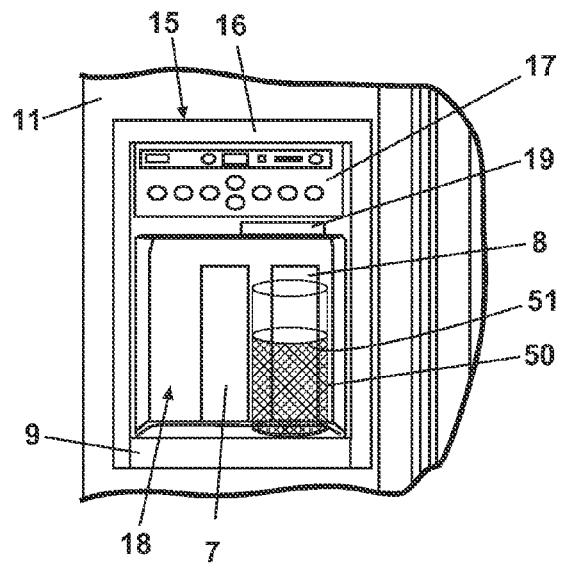
FIG. 6 is a partial front view of the refrigerator freezer illustrated in FIG. 1 having a container sized to receive a standard quantity of water positioned under the dispenser water outlet.

Turning to FIGS. 1A, 4 and 6 determination of the calibrated flow rate Calibrated WDV Flow Rate (units/sec) can be understood. A dispensing control 20 according to the invention can be calibrated by determining the time to dispense a standard quantity of water at the user's installation location and current water system conditions and then calculating the flow rate for dispensing the standard quantity of water. In one embodiment a container 50 sized to contain a predetermined quantity of water can be placed under spout 19. Container 50 can have a line 51 designating the standard quantity of water. In one embodiment the standard quantity of water can be 16 ounces and a standard unit can be 0.512 mL as used above in connection with algorithms (1) and (2). Those skilled in the art will understand that other standard quantities of water and standard units can be selected and the applicable algorithms adjusted accordingly. A user can initiate calibration by touching and holding the Calibrate touch pad 21, block 120 for a predetermined period of time to place dispenser control 20 in the calibrate mode, block 121. For example, the hold period can be three seconds in one embodiment. The user then can press container 50 into contact with paddle 8, or touch the Press to Fill touch pad 21 with container 50 positioned under spout 19 to initiate dispensing of water into container 50, block 122. The user can continue to press container 50 against paddle 8, or continue touching Press to Fill touch pad 21, until the water reaches line 51 and then stop filling container 50, block 123. Microcontroller 26 can accumulate the time that valve 40 is activated dispensing water into container 50. If the user is satisfied that container 50 is filled to line 51, the user can again touch or press the Calibrate touch pad 21 to signal microcontroller 26 that the standard quantity of water has been dispensed into container 50, block 124. At this point the calibrate cycle is complete and the microcontroller 26 can determine the calibrated flow rate, Calibrated WDV Flow Rate (units/sec), using the following algorithm:

$$\text{Calibrated WDV Flow Rate (units/sec)} = \frac{\text{standard quantity (units)}}{\text{time to dispense standard quantity (sec)}} \quad (3)$$

When the standard quantity is 16 ounces and a unit=0.512 mL the standard quantity=924 units. Microcontroller 26 can then load the value for Calibrated WDV Flow Rate (units/sec) into non-volatile storage in the microcontroller 26 and calibration is successful, block 125 replacing any prior calibration value.

The non-volatile storage in microcontroller 26 can be arranged to store the latest value for Calibrated WDV Flow Rate as the calibrated flow rate and can discard any prior values for Calibrated WDV Flow Rate. In the event a user determines that the amount of water dispensed into the container 50 does not reach line 51, block 130, the user can add additional water, block 131. Dispenser control 20 can be arranged to have a predetermined idle time to allow the user time to determine if container 50 has been filled to line 51. For example, if the user does not touch the Calibrate touch pad 21 within 10 sec., dispenser control 20 can exit the calibrate mode and return to the normal mode. If the user decides to add additional water the user can again press container 50 against paddle 8, or touch Press to Fill touch pad 21, to add additional water to container 50 until the user is satisfied that container 50 is filled to line 51, blocks 122 and 123. The user can press the Calibrate touch pad 21, block 124 to end the calibrate cycle or go back and dispense additional water, block 122. If a user determines that more that the standard quantity of water has been added to container 50, block 140, the user can press the Calibrate touch pad 21 to end the calibrate cycle, block 141 as a calibration failure, block 142. The user can then repeat the calibrate cycle as described above to replace the failed calibration value in the non-volatile storage in microcontroller 26. In addition, dispenser control 20 can be arranged to have calibration limits so that any calibration attempt of less than a lower limit or greater than an upper limit can be ignored and dispenser control 20 can revert to the normal fill mode. Dispenser control 20 can also be arranged so that, following a predetermined idle time in the calibration mode when the dispense time is greater than a lower limit and less than an upper limit, microcontroller 26 can calculate a new flow rate Calibrated WDV Flow Rate based on the accumulated dispense time and store the new flow rate Calibrated WDV Flow Rate in non-volatile storage in the microcontroller 26. Those skilled in the art will understand that a calibration cycle can be repeated from time to time as desired to adjust for any changes in water system conditions in the installation location since the last calibration routine. In addition, applicants have found that by calibrating the water flow rate according to the invention, a flow washer normally employed in water valves used with water dispensers is not required. While flow washers can have the benefit of providing a relatively constant flow rate over a range of water pressures, flow washers typically reduce flow rates and thus extend the time required to dispense larger quantities of water. Those skilled in the art will also understand that a flow washer can be employed in a water valve used with a dispenser control according to the invention, or with an ice maker water valve, if desired. In-line When the measured fill mode is not selected, block 101, the water dispenser can operate in a normal fill mode. In the normal fill mode, the dispenser control 20 can cause water dispenser 15 to dispense water as long as the water paddle 8, or Press to Fill touch pad 21, are actuated. In a normal fill mode water dispenser 15 can display the amount of water dispensed on display 22 on user interface 17. In the embodiment of FIG. 1A, dispenser control 20 can be arranged to display the amount of water dispensed in ounces. However, those skilled in the art will readily understand the units of measure can be in other units of measure instead of ounces. Dispenser control 20 can determine the amount of water being dispensed by monitoring the time valve 40 is activated using the following algorithm:

Current Dispense Amount=Current Fill Time*Calibrated WDV Flow Rate (4)

Dispenser control 20 can display the result on display 22 and can update the information at a rate sufficient to provide essentially real time display of the amount of water dispensed. In a normal fill mode the dispenser control 20 can be arranged to prohibit dispensing water when the freezer door 11 is open. Those skilled in the art will understand that dispenser control 20 can be arranged to provide a maximum dispensing time for the normal fill mode to protect system components.

In-line water filters such as filter 14 shown in FIGS. 1 and 2 have an effective life that can be predicted based on how long the filter has been in service and how much water has passed through the filter. Microcontroller 26 can include a time of day and date clock as is well known in the art. Dispenser control 20 can track the elapsed time since the water filter 14 has last been changed, the Filter Reset pad pressed and the amount of water passing through the filter 14. The amount of water passing through filter 14 can be determined by accumulating the Current Dispense Amount for each normal fill operation of the water dispenser 15 and the Measured Fill Amount for each measured fill operation. Alternately dispenser control 20 can accumulate Current Dispense Amount for all water dispensing operations, measured fill or normal fill. Dispenser control 20 can drive a filter condition display 25 on user interface 17 as shown on FIG. 1A. Water filter status can be displayed using a tri-color indicator that can be a single LED, a grouping of discrete LEDs or Icons that can be arranged to indicate Good Filter, Order Filter or Change Filter. In another embodiment, not shown, the water filter indicator can be a multi-color bargraph indicator using discrete LEDs or Icons to indicate multiple stages of Good Filter, Order Filter or Change Filter status. In another embodiment, not shown, the water filter indicator can be a display that can indicate gallons remaining combined with Good Filter and Change Filter displays. Those skilled in the art will understand that other displays or arrangements can be used to indicate the water filter status. After a water filter 14 has been replaced, the user can reset the dispenser control 20 by touching and holding a Filter Reset touch pad 21 on user interface 17. The touch and hold duration to reset the filter monitor can be preset in dispenser control 20 at a predetermined period such as 3 seconds. Microcontroller 26 can be programmed via communication port 27 to set the microcontroller to indicate the need to change a filter 14 as a function of elapsed time and water usage based on the type and capacity of water filter 14 to be used in the brand/model of refrigerator freezer for which the dispenser control 20 is to be used.

Dispenser control 20 can also be arranged to dispense a predetermined measured amount of water to fill an ice maker mold. For example, dispenser control 20 can be arranged to dispense 130 cubic centimeters (cc) of water to the ice maker in response to a fill message from ice maker 23. Those skilled in the art will understand that when the dispenser is an ice and water dispenser valve 40 can be replaced by a dual valve, not shown, having separate valves for dispensing water and for filling the ice mold, not shown, of ice maker 23. Alternately, if desired, a single valve 40 can be coupled with a diverter valve, not shown, to direct water to ice maker 23 or spout 19 depending on the operation called for by dispenser control 20. In the event a separate valve, not shown, is provided for ice maker 23 the ice maker water valve can be provided with a flow washer if desired to provide more uniform volume over changing water pressures. As mentioned above dispenser control 20 can include communication port 27 to allow programming of the microcontroller 26 for operation with the brand/model refrigerator freezer for which the particular control is intended, water filter data, and in addition ice maker water fill quantity.

Figure 7:
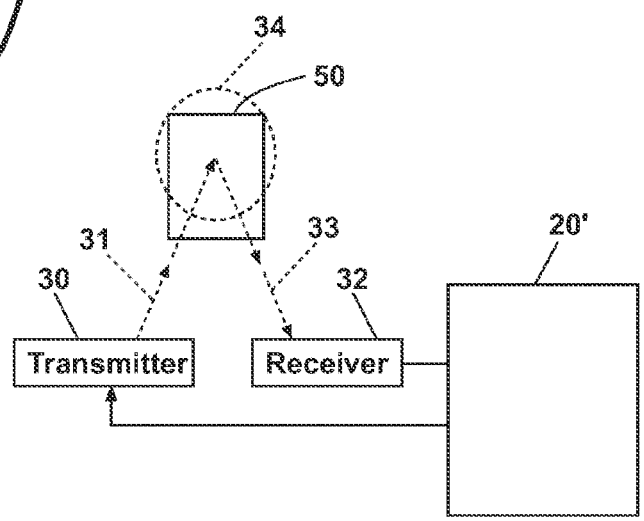
FIG. 7 is a partial schematic drawing of another embodiment of a measured fill water dispenser according to the invention having an optical sensor to determine when a standard quantity of water is dispensed into a container as illustrated in FIG. 6.

Turning to FIG. 7 water dispenser 15' can be arranged to automatically fill standard container 50 in the calibration mode using known technology for determining when a container is filled to a desired level. U.S. Pat. No. 5,550,369 incorporated herein by reference discloses an optical method and apparatus for detecting when a container has been filled to a desired level. Dispenser control 20' can be connected to a transmitter 30 and receiver 32 that can be arranged in recess 18 so that container 50 is positioned in target window 34. Transmitter 30 can be arranged to direct light beams 31 into container 50 and receiver 32 can be arranged to detect light beams 33 reflected from liquid in container 50. Dispenser control 20' can be arranged to detect when water has filled container 50 to line 51 based on the signal from receiver 32 and then stop dispensing similar to a user stopping dispensing when container 50 is filled to line 51, as in the case of block 123 (FIG. 4). In the embodiment of FIG. 7 the calibration process in FIG. 4 could be simplified to placing a container 50 under spout 19 and pressing Calibrate touch pad 21. Upon activation of the calibration mode, dispenser control 20' can activate valve solenoid 41 and operate transmitter 30 and receiver 32 to detect when container 50 is filled to line 51 and then deactivate valve solenoid 41. As described above, dispenser control 20' can accumulate the time to fill container to line 51 and can calculate a new Calibrated WDV Flow Rate using algorithm (3) as described above. The new Calibrated WDV Flow Rate can be stored in non-volatile storage as described above.

Figures 8, 9:
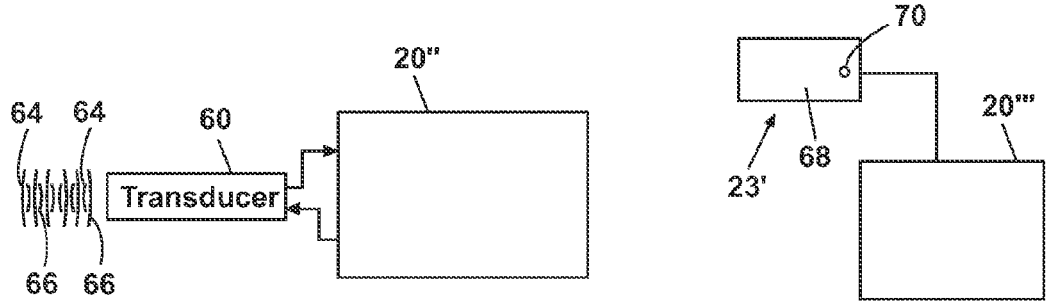
FIG. 8 is a partial schematic drawing of another embodiment of a measured fill water dispenser according to the invention having an ultra-sonic sensor to determine when a standard quantity of water is dispensed into a container as illustrated in FIG. 6.
FIG. 9 is a partial schematic drawing of another embodiment of a measured fill water dispenser according to the invention having a sensor to determine when a standard quantity of water is dispensed into an ice maker mold.

Turning to FIG. 8, another approach to automatically filling container 50 can be seen. U.S. Pat. No. 4,572,253 incorporated herein by reference discloses an ultrasonic method and apparatus for detecting when a container has been filled to a desired level. Dispenser control 20" can be connected to an ultrasonic transducer 60 that can be arranged in recess 18 so that sonic waves can detect the level in container 50. Transducer 60 can be arranged to direct emitted ultrasonic waves 64 into container 50 and detect reflected ultrasonic waves 66 reflected from liquid in container 50. Dispenser control 20" can be arranged to detect when water has filled container 50 to line 51 and then stop dispensing similar to a user stopping dispensing when container 50 is filled to line 51 based on the signal from transducer 60, as in the case of block 123 (FIG. 4). In the embodiment of FIG. 8 the calibration process in FIG. 4 could be simplified to place container 50 under spout 19 and press Calibrate touch pad 21. Upon activation of the calibration mode, dispenser control 20" can activate valve solenoid 41 and operate ultrasonic transducer 60 to detect when container 50 is filled to line 51 and then deactivate valve solenoid 41. As described above, dispenser control 20" can accumulate the time to fill container to line 51, and can then calculate a new Calibrated WDV Flow Rate using algorithm (3) as described above. The new Calibrated WDV Flow Rate can be stored in non-volatile storage in microcontroller 26 as described above.

Turning to FIG. 9, another approach to determining a Calibrated WDV Flow Rate can be seen. In the embodiment of FIG. 9, ice maker 23' can have a sensor 70 to detect when ice mold 68 is filled with a desired amount of water. Dispenser control 20''' can be arranged to have a calibration mode that comprises filling the ice mold 68 to the desired level and accumulating the time to fill ice mold 68 to the desired level. In one embodiment sensor 70 can be a thermistor to detect when water has been added to the ice mold 68 to a predetermined level. Those skilled in the art will understand that the number of units to fill an ice maker cavity can be different than the number of units in 16 ounces of water. Accordingly, the standard quantity of units in algorithm (3) can be adjusted to correspond to the standard quantity of water in the ice mold 68. In operation this embodiment could be similar to the embodiments of FIG. 7 and FIG. 8 with the calibration mode being invoked by a user touching Calibrate touch pad 21 as above. Dispenser control 20''' can initiate an ice maker fill cycle to cause water to flow into ice mold 68 until a sensor 70 indicates that the standard quantity of water has been added to ice maker 23'. As above dispenser control 20''' can calculate a new Calibrated WDV Flow Rate using algorithm (3) modified to incorporate an appropriate number of standard units for the volume of the ice mold as described above. In the event ice maker 23' is in the process of freezing ice pieces so that ice mold 68 is filled with frozen or partially frozen water, dispenser control 20''' can defer the calibration mode to the next ice maker fill cycle. Alternately, dispenser control 20''' can be arranged to periodically conduct a calibration routine when ice maker 23' is filled following an ice harvest cycle. A calibration routine could be conducted each time ice maker 23' is filled if desired.

While the invention has been specifically described in connection with certain embodiments thereof, it is to be understood that this is by way of illustration and not of limitation and the scope of the appended claims should be construed as broadly as the prior art will allow.

What is claimed is:

1. A refrigerator having a water dispenser for dispensing water from a source of water comprising:
    a user accessible water outlet;
    a water valve connected to the source of water and to the water outlet to control flow of water to the water outlet;
    a dispensing actuator; and
    a water dispensing control connected to the water valve and to the dispensing actuator to control operation of the water valve having a microcontroller including:
        a user operable calibration routine to determine a calibrated flow rate based on the time to dispense a standard quantity of water from the source of water;
        a non-volatile storage to store the calibrated flow rate; and
        a calibration actuator to initiate the calibration routine.

2. The refrigerator according to claim 1, wherein the microcontroller stores the most recent calibrated flow rate in the non-volatile storage.

3. The refrigerator according to claim 1, the water dispenser control further including a measured fill mode of operation, and wherein the microcontroller is arranged to calculate a measured fill time to dispense a user selected amount of water based on the calibrated flow rate.

4. The refrigerator according to claim 3, wherein the microcontroller further includes a timer and the measured fill time is loaded into the timer, and wherein the microcontroller is arranged to operate the water valve for the measured fill time to dispense the user selected amount of water upon operation of the dispensing actuator.

5. The refrigerator according to claim 3, the water dispenser further including a user interface including a selection actuator arranged for a user to select the units and amount of water to be dispensed.

6. The refrigerator according to claim 3, the water dispenser control further including a normal fill mode of operation in which the microcontroller operates the water valve in response to operation of the dispensing actuator.

7. The refrigerator according to claim 1, the refrigerator further including an ice maker and an ice maker water valve connected to the source of water and to the ice maker to control flow of water to the ice maker, wherein the microcontroller operates the ice maker water valve to add an amount of water to the ice maker based on the calibrated flow rate and any differences in the calibrated flow rate and the ice maker water valve flow rate.

8. The refrigerator according to claim 7, wherein at least one of the water valve and the ice maker water valve includes a flow washer.

9. The refrigerator according to claim 1, wherein the microcontroller is arranged to calculate the amount of water dispensed based on the time the water valve is operated and the calibrated flow rate.

10. The refrigerator according to claim 9, the water dispenser further including a user interface having a display for the amount of water dispensed, and wherein the microcontroller is arranged to operate the display to inform the user of the amount of water dispensed.

11. The refrigerator according to claim 10, the water dispenser further including a user interface including a selection actuator arranged for a user to select the units and amount of water to be dispensed.

12. The refrigerator according to claim 1, further including a water filter connected between the source of water and the water outlet, wherein the non-volatile storage is arranged to store the accumulated amount of water flowing through the water filter, and wherein the microcontroller is arranged to;
    calculate the amount of water flowing through the water filter based on the time the water valve is operated and the calibrated flow rate; and
    add the amount of water passing through the water filter when the water valve is operated to the accumulated amount of water passing through the water filter stored in the non-volatile storage.

13. A refrigerator having a water dispenser for dispensing water from a source of water comprising:
    a user accessible water outlet;
    a water valve connected to the source of water and to the water outlet to control flow of water to the water outlet;
    a dispensing actuator; and
    a water dispensing control connected to the water valve and to the dispensing actuator to control operation of the water valve having a microcontroller including:
        a user operable calibration routine to determine a calibrated flow rate based on the time to dispense a standard quantity of water from the source of water;
        a non-volatile storage to store the calibrated flow rate;
    a water filter connected between the source of water and the water outlet, wherein the non-volatile storage is arranged to store the accumulated amount of water flowing through the water filter, and wherein the microcontroller is arranged to:
        calculate the amount of water flowing through the water filter based on the time the water valve is operated and the calibrated flow rate; and
        add the amount of water passing through the water filter when the water valve is operated to the accumulated amount of water passing through the water filter stored in the non-volatile storage; and
    a user interface having a water filter condition display and a filter reset actuator, and wherein the microcontroller is arranged to operate the water filter condition display based on the accumulated amount of water passing through the water filter stored in the non-volatile storage and the elapsed time since the filter reset actuator was last operated.

14. The refrigerator according to claim 1, wherein the user operable calibration routine includes filling a container with the standard quantity of water by manually operating the dispensing actuator.

15. The refrigerator according to claim 1, the water dispensing control further comprising a sensor arranged to sense the standard quantity of water in a container positioned adjacent the user accessible water outlet, and wherein the user operable calibration routine includes filling a container with the standard quantity of water by sensing the standard quantity of water with the sensor.

16. The refrigerator according to claim 15, wherein the sensor is an ultra-sonic sensor arranged to detect the standard quantity of water in the container.

17. The refrigerator according to claim 15, wherein the sensor is an optical sensor arranged to detect the standard quantity of water in the container.

18. A refrigerator having a water dispenser for dispensing water from a source of water comprising:
   a user accessible water outlet;
   a water valve connected to the source of water and to the water outlet to control flow of water to the water outlet;
   a dispensing actuator; and
   a water dispensing control connected to the water valve and to the dispensing actuator to control operation of the water valve having a microcontroller including:
      a user operable calibration routine to determine a calibrated flow rate based on the time to dispense a standard quantity of water from the source of water;
      a non-volatile storage to store the calibrated flow rate;
      a sensor arranged to sense a standard quantity of water in a container; and
   an ice maker and an ice maker water valve connected to the source of water and to the ice maker to control flow of water to the ice maker, wherein the ice maker includes an ice mold forming the container and wherein the sensor is arranged to detect a standard quantity of water in the ice mold.

19. A method comprising calibrating the amount of water flowing from a source of water to a refrigerator through a water valve controlled by a water valve control including a microcontroller having non-volatile storage comprising:
   determining the time for the water valve to dispense a standard quantity of water from the source of water;
   calculating a calculated flow rate for dispensing the standard quantity of water based on the time to dispense the standard quantity of water; and
   storing the calculated flow rate in the non-volatile storage;
   wherein refrigerator includes a water filter and a water filter condition display and a filter reset actuator; and
      the method further includes calculating the amount of water flowing through the water filter based on water valve operating time and the calculated flow rate, accumulating the amount of water flowing through the water filter in the non-volatile storage, and operating the water filter condition display based on the accumulated amount.

20. The method according to claim 19, wherein the refrigerator further includes a water dispenser having a measured fill mode of operation in which a user can select an amount of water to be dispensed; and the method further includes calculating a measured fill time for a user selected amount of water to be dispensed based on the calculated flow rate.

* * * * *